(12) United States Patent
Baron

(10) Patent No.: US 9,686,921 B2
(45) Date of Patent: Jun. 27, 2017

(54) METHOD OF GROWING GRAPEVINES

(76) Inventor: Richard S. Baron, West Bloomfield, MI (US)

( * ) Notice: Subject to any disclaimer, the term of this patent is extended or adjusted under 35 U.S.C. 154(b) by 1307 days.

(21) Appl. No.: 12/917,886

(22) Filed: Nov. 2, 2010

(65) Prior Publication Data

US 2012/0102832 A1 May 3, 2012

(51) Int. Cl.
*A01G 17/00* (2006.01)

(52) U.S. Cl.
CPC .................. *A01G 17/005* (2013.01)

(58) Field of Classification Search
CPC ....... A01G 17/005; A01G 17/02; A01G 17/00
USPC .................. 47/32.7, 66.7; 111/170
See application file for complete search history.

(56) References Cited

U.S. PATENT DOCUMENTS

| | | | | |
|---|---|---|---|---|
| 3,526,993 A * | 9/1970 | Siebol | ............................. | 47/46 |
| 4,019,279 A * | 4/1977 | Moorman et al. | ............. | 47/32.8 |
| 4,042,655 A | 8/1977 | Platt et al. | | |
| 4,154,889 A | 5/1979 | Platt | | |
| 4,199,644 A | 4/1980 | Platt | | |
| 4,357,884 A * | 11/1982 | Rast, Jr. | ........................ | 111/114 |
| 4,442,628 A | 4/1984 | Whitcomb | | |
| 4,457,102 A | 7/1984 | Ploeger, Jr. | | |
| 4,524,522 A | 6/1985 | Perry | | |
| 4,574,522 A | 3/1986 | Reiger et al. | | |
| 4,884,367 A | 12/1989 | Lawton | | |
| 4,995,969 A * | 2/1991 | LaVigne | ....................... | 210/150 |
| 5,099,607 A | 3/1992 | Lawton | | |
| 5,181,952 A * | 1/1993 | Burton et al. | ................ | 504/347 |
| 5,544,447 A | 8/1996 | Easey et al. | | |
| 5,947,041 A * | 9/1999 | Licht | ............................. | 111/200 |
| 6,202,348 B1 | 3/2001 | Reiger | | |
| 6,230,439 B1 | 5/2001 | Solis | | |
| 6,523,300 B2 * | 2/2003 | Smith | ....................... | A01G 1/08 256/12.5 |
| 6,862,840 B1 * | 3/2005 | Single | ............................ | 47/32.7 |
| 6,904,715 B1 | 6/2005 | Lawton | | |
| 7,353,635 B2 | 4/2008 | Westrate | | |
| 2005/0034361 A1 * | 2/2005 | Single | ............................ | 47/32.7 |

FOREIGN PATENT DOCUMENTS

EP 0313327 A2 4/1989

OTHER PUBLICATIONS

The South Coast Botanic Garden: From Landfill to Jewel of the Peninsula By: Laurel Woodley WWW.pacifichorticulture.org/pdfs/content/2958/woodley.oct09.pdf.*

(Continued)

*Primary Examiner* — Tien Dinh
*Assistant Examiner* — Ebony Evans

(57) ABSTRACT

A method for growing grapevines in a root inhibiting vessel permanently planted in previously existing solid waste landfill mounds is disclosed. The vessel or container is a porous polymeric bag or fabric sleeve liner closely received in the container. A fabric disc is positioned in the bottom of an excavated hole in the cover layer of a landfill. The fabric liner is needle-punched to create a rough surface capable of trapping the roots of the growing grapevine and direct the roots into the side of the container such that the apical dominance of the root is stopped to restrict growth and promote root branching on the inside of the container to create a fibrous root system within the container.

17 Claims, 2 Drawing Sheets

(56) References Cited

OTHER PUBLICATIONS

Tony Correia, Locational Consideration in the Valuation of Permanent Plantings, 2000 Journal of the ASFMRA.
Beth A. Gross, Landfill Cover Design and Operation, USEPA Workshop on Bioreactor Landfills, GeoSyntec Consultants.
Linette Gerlach, How to Grow Grapes: Choosing Varieties, Vines, Pruning, Trellis, http://www.howtodothings.com/home-and-garden/a4255-how-to-grow-grapes.html.
Stephen S. Miller & Thomas Tworkoski, Regulating Vegetative Growth in Deciduous Fruit Trees, PGRSA Quarterly, vol. 31, No. 1, 2003.
Dr. Leonard Perry, Northern Grape Growing, http://perrysperennials.info/articles/growgrapes.html.
G. Sellers, SG McRae & HF Cook, The Potential for Cereal Crop Production on a Former Landfill Site Restored with London Clay, Land Contamination & Reclaimation, 9 (1), 2001.
3 Landfill Cover Technology, Landfill Covers, Landfill Cover Technology.
William Lord, Growing Grapes, University of New Hampshire Cooperative Extension.
Tony K. Wolf, Optimized Grape Potential Through Root System & Soil Moisture Manipulations.
Danie, How to Grow Grapes, http://.my-grape-vine.com/blog/growing-grapes-in=shallow-soil/.
The Smart Pot Root Control Bag—In Ground, http://www.treebag.com/smart_pot_in_ground.html.
Eric Liskey, Golf Course Reclaim "Lost" Land, http://grounds-mag.com/golf_courses/grounds_maintenance_golf_course_reclaim/.
Tony K. Wolf, Viticulture Notes, vol. 24, No. 3, Sep.-Oct. 2009, Virginia Cooperative Extension.

* cited by examiner

METHOD OF GROWING GRAPEVINES

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING

Not applicable.

BACKGROUND OF THE INVENTION

The present invention relates to a plant-growing method and more particularly, to a new method for growing grape vines in root control containers permanently planted in previously existing solid waste landfills.

As a result of the demand for increased uses of all lands, reclamation of previous uses of land for abandoned mines, quarries, landfills, and hazardous waste sites, spoiled by all manner of contaminants, continues to increase. This trend started as a result of a few projects that demonstrated how, with proper engineering and construction, sites that no one wanted could become parks, golf courses, or other recreational facilities.

Land reuse is an important consideration in landfill design. The fact that human activity is expected and even encouraged on a final landfill site requires that more critical attention be given to its design. The anticipated final use of a landfill for parks, golf courses, bicycle paths, and nature areas will require using compatible materials in the cover; perhaps modify the topography and selecting vegetation that is appropriate for its end use. Engineered landfill covers have been employed only in the last few decades. Nearly all landfill covers in place today are conventional, barrier-type landfill covers. Conventional covers employ barrier technology and typically include five layers above the waste. The top layer consists of cover soil that is typically a minimum of 24 inches thick and normally supports a grass cover that provides wind and water erosion control. The second layer is a drainage layer that quickly removes any water that percolates through the cover soil. This water is stopped by the underlying barrier layer. The barrier layer consists of either a single low-permeable barrier or two or more barriers in combination. The fourth layer is the gas control layer that is required under the barrier to remove landfill gasses before they accumulate in harmful amounts, i.e. landfill gas may be collected for reuse or burned (flared) at or adjacent to the landfill location in order to minimize risks to offsite exposure and fire or explosion hazards. The bottom layer is of variable thickness and material, and provides a foundation for cover construction. It separates the waste products from the cover and establishes sufficient gradient to promote rapid and complete surface drainage from the finished cover. To insure adequate surface drainage the surface slope should be at least 2.5% after landfill settlement.

It is the construction of the cap or cover that is the most problematic for growing anything other than grasses, small shrubs, etc. Shallow rooted vegetation allows for cover stabilization, erosion prevention, and minimizes the aesthetic impacts that would be present with a large mound of bare ground. These landfill mounds may be many acres in size and often have significant slope area. The use of landfill mounds for the growing of deep rooted plants would dramatically increase the depth and cost of the final cap and could result in root penetration and disruption of the integrity of the cap. In particular, grapes (vitis vinifera, vitis riparia, and related species) have roots which can penetrate the soil 12'-15' or more and the soil cover or cap on the landfill may be in the order of 3'-4' at best. Due to the landfill contents, root penetration of the grapevine into buried materials is detrimental to the health of the vine and could result in the uptake of bio-accumulative chemicals that could be passed along to the fruit.

Due to both late (spring) and early (fall) frost susceptibility, vitis sp, are frequently planted on hillsides or terraced areas so that cooler air, being denser than warmer air, may drain down slope minimizing the opportunity for ice crystals to form and damage buds, leaves, and growing shoots. Hillside and sloped land, particularly with southern exposures may be put to a variety of other uses, including orchards, residential development or recreational. In urban areas, the best economic use of sloped land may not be agricultural but rather residential development.

Therefore, what is needed is a method of planting grapevines that manages the issue of root control as a means for allowing the planting of grapevines in landfills while preventing intrusion into the landfill contents.

SUMMARY OF THE INVENTION

The above need is met by the present invention which provides a novel plant growing method for growing grapes on previously existing landfill mounds. The method of the present invention consists of the use of a type of vessel or container in the form of an impermeable container preferably plastic, or root control bag having an inner surface and outer surface, an impermeable container may include a fabric sleeve liner closely received in the pot. The container or root control bag is filled with a specific mixture of soil, pH adjusted that is appropriate for a grapevine. The underlying soil mixture of the landfill is immaterial since the roots are to be restricted within the container. A fabric disc may be positioned on the bottom of the container before the soil mixture is added. The fabric sleeve or liner is of an overall size and configuration such that it fits snugly within the container so that the outer surface of the liner is adjacent to the inner surface of the container.

The fabric liner is preferably made of a porous needle-punched fabric of fibers which are tangled and knotted as a result of being needle-punched to create a rough surface capable of trapping or catching plant roots. The outer surface of the fabric is heat-bonded to create a smooth surface and to provide stiffness to the fabric sleeve. The fuzzy inner surface is utilized to trap the roots of the growing grapevine and direct the roots into the side of the container. As a result, the apical dominance of the roots is stopped to restrict growth and promote root branching on the inside of the container to create a fibrous root system within the container. The container pot or root control bag is then permanently planted in a designated area of the landfill. Successful vineyards require a suitable site and location, preferably a hillside with a southern exposure; adequate water, nutrition, and soil characteristics; sufficient "degree days" for growing temperature; and sufficient frost-free days for ripening. Due to the grapevine's sensitivity to frost damage, many vineyards are planted on hillsides. This allows cool to cold air to settle past the vines and assists in mitigating early and late frosts. In an urban and potentially non-urban environment, an area with both a sloping hillside and adequate sunlight may be found at fully constructed landfill sites. Some landfills have used large mounds remaining after capping and covering for construction of new ski hills or other recreational activities. The invention proposes the use of such landfills as optimal locations for permanently planting the root restriction containers with grapevine plants therein so as to create a productive vineyard over time.

It is an object of the present invention to provide a method for growing grapes on grapevines that are permanently planted in some form of vessel or container that partially confines plant root propagation, restricts lateral root extension, and controls root swirl thereby stimulating and accelerating root branching within the container or barrier.

It is a further object of the invention to provide a container which catches growing root tips and directs them into a barrier wall so that the apical dominance and growth thereof is stopped and root branching consisting of a very fibrous compact root system within the container occurs.

It is yet a further object of the invention to permanently plant the container having the grapevine planted therein in a designated area of a fully constructed landfill which has been capped and covered preferably with a southern-facing sloping top surface.

It is yet a further object of the inventive method to provide a commercially viable method of growing grapes for wine, table grapes, raisins, and/or juice which is economical, utilizes landfill properties as the vineyard, and wherein the grown fruits are completely safe for human consumption.

It is yet a further object of the invention to provide the manner and method of controlling vine vigor by restricting root growth which will naturally restrict the resulting growth the trunk, canes, and fruiting spurs.

It is yet a further object of the invention to allow for the increased density of vine plantings (i.e. 3' to 8' between vines) which will partially offset the decreased vigor associated with vine growth in the root control bags.

Other and further objects, features, and advantages of the present invention will be readily apparent to those skilled in the art upon a reading of the description of the preferred embodiments which follows when taken in conjunction with the accompanying drawings.

DETAILED DESCRIPTION OF THE PREFERRED EMBODIMENT

Figure 1:
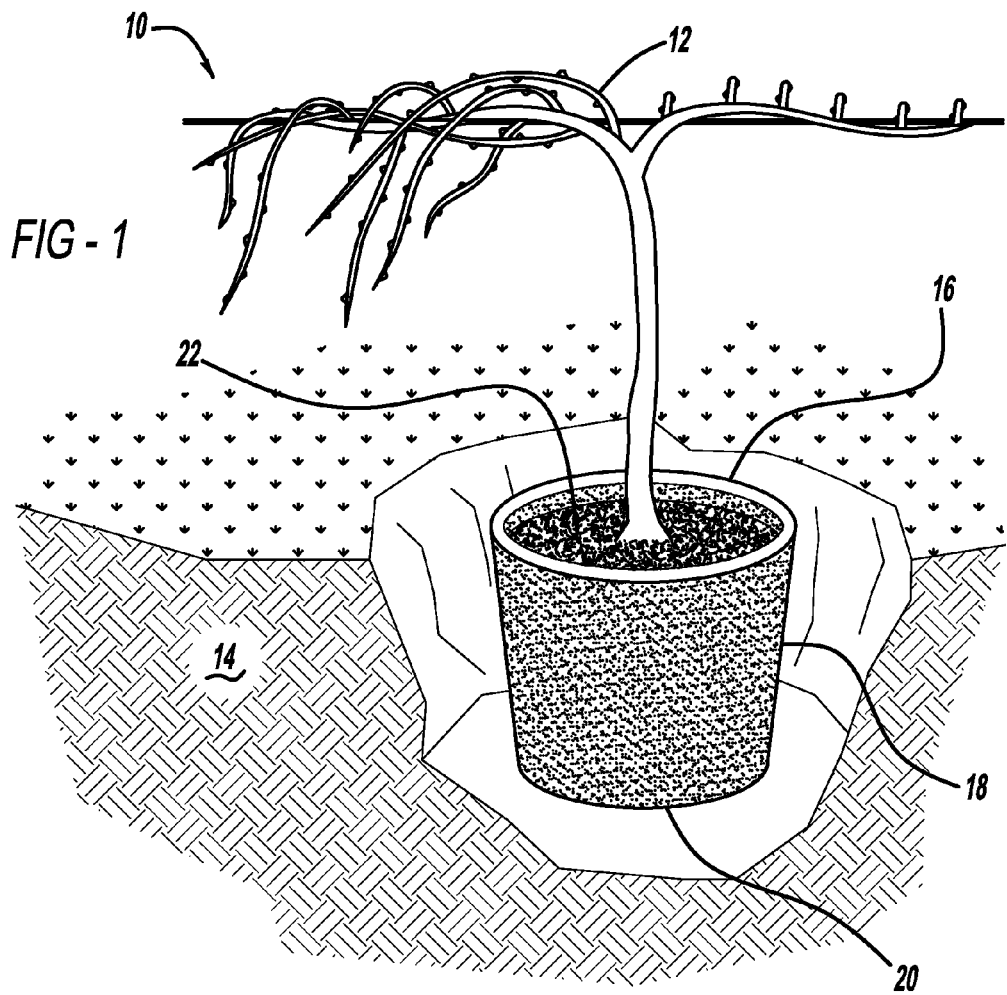
FIG. 1 is a pictorial representation of the preferred embodiment of the invention.
Figure 2:
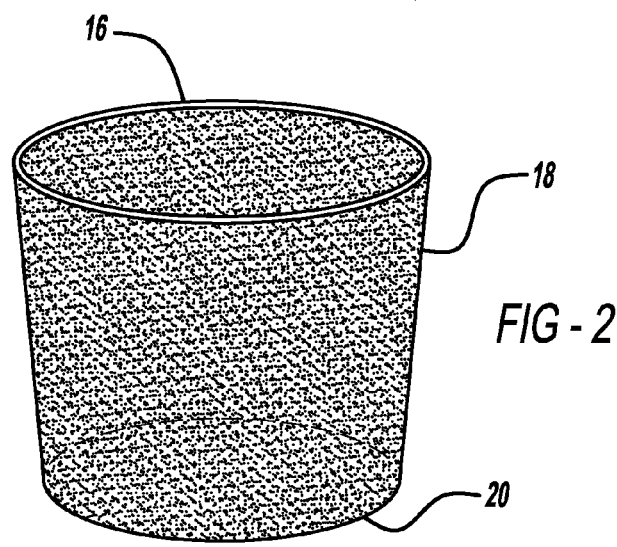
FIG. 2 is a perspective view of a type of vessel or container that is used to inhibit root growth.

Referring generally to FIG. 1, the invention is a root control and containment system for controlling and growing a grapevine plant root system in a vessel or container in the cover layer of an existing closed landfill site. In the United Kingdom, government policies regarding the preservation of agricultural land requires most landfill sites to be restored to agriculture (both areable and pasture land). Studies have shown that barley and wheat have been successfully grown with appropriate fertilizer, weed control, and cultivation. However, it is noted that the root structure and such crop is generally no deeper than one and one-half feet deep. In comparison, the root structure of a grapevine can be as much as 12-15 feet. In addition, the physical construction of modern, high mounded landfills provide an optimal area for south facing slopes, cold air drainage, and frost protection, all of which are critical elements in the production of grapes.

The manipulation of root systems limits the uptake of resources but has been successful on fruit trees. Pruning of roots can significantly disrupt a peach tree root system in which 50%-60% of the roots are in the top ten inches of soil and 90% in the upper 20 inches of soil. In apple trees, 79% of all roots have been found in the upper ten inches of soil. Physical reduction of root growth decreases resource uptake and creates a plant growth imbalance which can adversely affect shoot growth. A simple allometric change could reduce shoot growth until a more favorable root-to-shoot ration is established and shoot growth is no longer inhibited.

Accordingly, FIG. 1 illustrates the invention wherein the invention 10 is a root control containment system for growing a grapevine 12 in a ground cover layer 14 of a landfill. The invention consists of a vessel or container 16 with upstanding sidewalls 18 and a base 20 therebetween and an open top 22 thereabove. More specifically, the vessel or container 16 must provide root inhibiting growth control of the root system and be of sufficient strength and durability to remain in the ground for a long period of time. Preferably, the vessel is a root restriction liner or root control bag made from a synthetic decay resistant, non-woven, porous, polymeric fabric having sufficient strength as equivalent to burlap used in the nursery industry. The method of the invention contemplates that the fabric employed to make the bag should have sufficient structural integrity and be sufficiently impervious to root penetration such that the root growth will only partially penetrate the fabric. Because of the partial penetration of the fabric bag, the root growth at the surface of the fabric will be severely constricted, thus promoting root branching. However, other non-woven, porous, bonded polymeric fabrics, plastic or other liner materials are envisioned as being equivalent for purposes of the invention provided the requisite porosity and structural strength as well as resistance to degradation when buried in the earth are achieved. Thus, many of the vinyl compositions or vinyl coated fabrics are to be considered equivalent for purposes of this invention.

As mentioned above, the preferred fabric for use in accordance with the present invention is a non-woven, porous, polymeric fabric of the type described in U.S. Pat. Nos. 4,154,889; 4,042,655; 4,199,644; and 5,009,607. Root control bags, as disclosed in U.S. Pat. Nos. 4,524,522 and 4,884,367 are also preferred for use with the present invention.

More recently, other vessels or containers that are equivalent for purposes of the invention have been proposed for commercial use. The proposed impermeable pot, as disclosed in U.S. Pat. No. 6,202,348 by Reiger is made of an impermeable plastic, having an inner surface and outer surface, and includes a fabric sleeve liner closed received in the pot. The container is filled with a specific mixture of soil, pH adjusted that is appropriate for a grapevine. The underlying soil mixture of the landfill is immaterial since the roots of the grapevine are to be restricted within the container. A fabric disc may be positioned on the bottom of the container before the soil mixture is added. The fabric sleeve or liner is of an overall size and configuration such that it fits snugly within the container so that the outer surface of the liner is adjacent to the inner surface of the container. Then the seedling or cutting or grapevine (all of which for clarity are referred to as a "grapevine") would be planted into the resulting mixture with the root control bag or fabric container being significantly larger than the vine. Size wise, 3' dia, 4' dia, or 5' dia on centers would allow adequate vine spacing while likely providing sufficient soil to mass to hold nutrients and moisture. 8'×8' (between rows and vines) is not uncommon. However, because the vines will be significantly less vigorous due to the truncated root structure and will not be pulling significant nutrients outside the bag, closer spacing will be appropriate.

The fabric liner is preferably made of a porous needle-punched fabric of fibers which are tangled and knotted as a result of being needle-punched which creates a rough surface capable of trapping or catching plant roots. The outer surface of the fabric is heat-bonded to create a smooth surface and to provide stiffness to the fabric sleeve. The fuzzy inner surface of the liner is utilized to trap the roots of the growing grapevine resulting in the roots being directed into the sides of the container. As a result, the apical dominance of the roots is stopped to restrict growth and promote root branching to create a fibrous root system within the container when the container is permanently planted in the cover layer of the landfill which over time will provide a grown vine with grapes for wine, table grapes, and/or juices.

Root inhibiting carbon bond materials as disclosed in U.S. Pat. No. 5,544,447 to Easey et al., can also be used as the vessel to use with the present invention. In fact, any form of vessel or container having some form of liner of sufficient strength and ability to severely restrict penetration of the fabric by the roots can be used. In the application of the invention, the roots of the grapevine are primarily confined within the vessel or root bag. Due to the non-elastic nature of the non-woven material, severe restriction of the root will occur in the event that any root tip penetrates the bag. This will prevent significant growth of any root located outside of the bag. While the plant remains healthy within the root bag, it does not appreciably grow while its roots are confined therein yet the yield of the fruit, i.e., the grapes may not be appreciably affected since root branching occurs within the vessel, container, or root bag.

Grapevines are typically pruned yearly to allow for the growth of fruiting spurs from the prior year's wood. Vines with rampant growth, either due to lack of pruning, excessive fertilization or soil conditions, may produce more grapes per acre (yield), but the resulting quality will decrease with excessive fruit production. Some varieties of *vitis* are grafted onto devigorating rootstocks to address this issue. In addition, pruning serves to decrease the amount of fruit set, decrease the amount of basal area relative to clusters and otherwise balance the vine for the optimal mix of productivity and quality.

Figure 3:
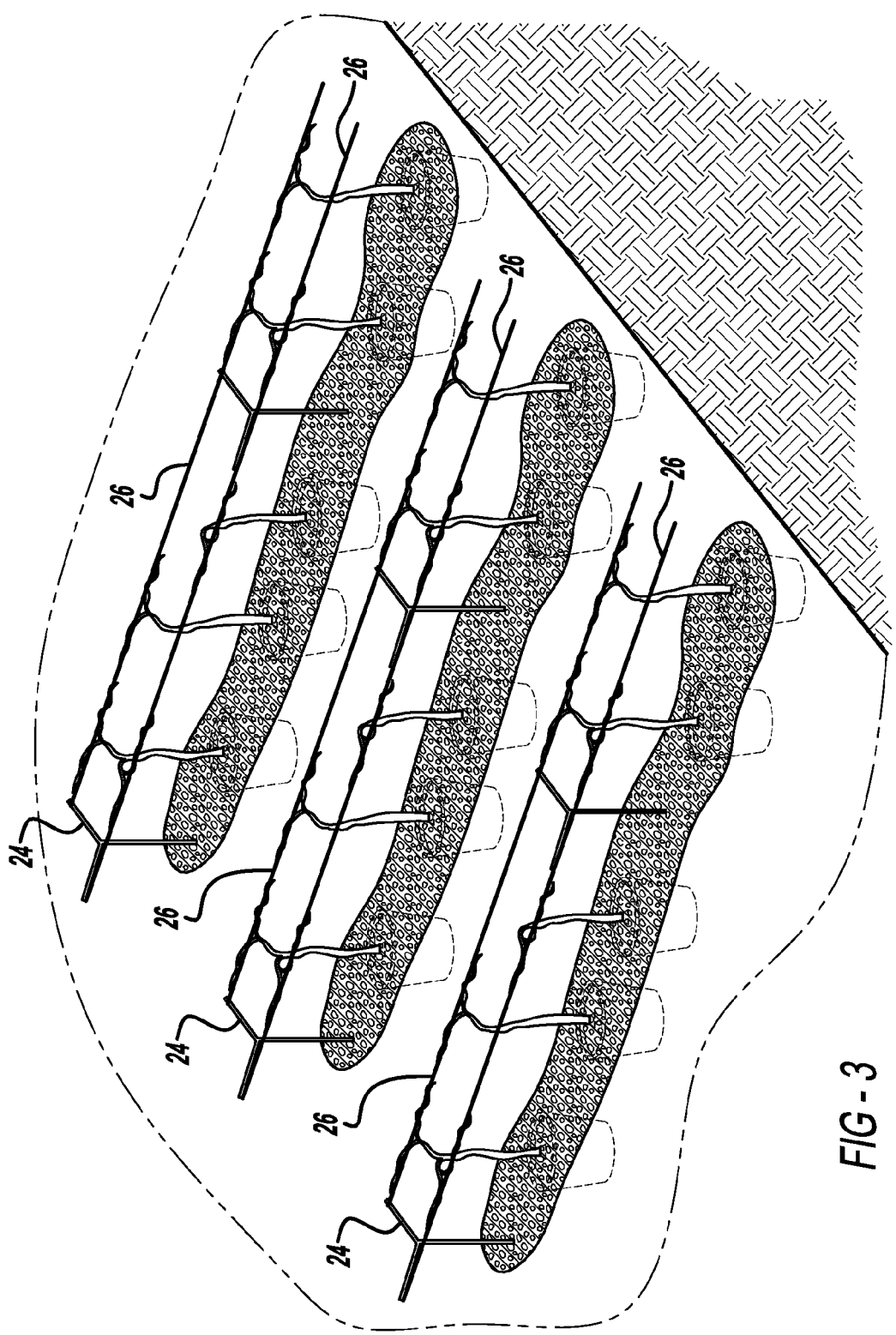
FIG. 3 is a partial perspective of a vineyard located on the southern facing slope of a landfill.

The use of the polymeric fabric liner or root bag according to the present invention is straightforward. An appropriate row of holes are excavated or dug in the soil cover of the landfill as shown in FIG. 3 and in each hole a root inhibiting liner or bag is inserted as a liner, or a root bag can temporarily be placed at an appropriate location above the ground. A polymeric fabric disc may be positioned in the bottom of each hole before inserting the polymeric fabric liner. A disc Is not necessary when using a root control bag. An appropriate growing media of soil, pH adjusted, is thereafter placed into each fabric liner or root control bag. The grapevine seedling is then planted into the soil of each liner and in the case of a root bag filled above the ground, the bag is lowered into the ground and the soil is backfilled into the hole and firmly packed around the root control bag or fabric vessel container. The top of the root bag is maintained aboveground to prevent lateral roots to spread beyond the container.

As shown in FIG. 3, a suitable trellis system including vertical posts 24 with wire supports 26 retaining horizontally extending wires appropriately spaced to support the grapevine may be constructed. The ground cover used, watering, cultivation, fertilizing, weed control, and trimming of the vines which will eventually grow on the trellis will be a function of the type of grape grown and none of this maintenance work is intended to be other than what is conventionally practiced in the field of growing grapes. Trellis posts may be shallower or of a different design to take into account less soil depth. With the use of the invention, it is likely that watering will be increased due to lower soil volume for moisture retention. Also, the lower mass of roots will likely require regular distribution of nutrients and moisture to compensate for less capacity. Accordingly, having described the invention with a certain degree of particularity, it is important to a person skilled in the art to recognize that changes can be made in the details of the construction of the root inhibiting vessel and the method of employing the vessel without departing from the scope of the invention. Therefore, it is to be understood that the invention is not limited to the preferred embodiments disclosed but is to be limited only by the scope of the attached claims, including a full range of equivalents to which each element thereof is entitled.

What is claimed is:

1. A method of growing a grapevine in a cover layer of a landfill to produce grapes for direct human consumption, said method comprising the steps of:
   excavating at least one hole in said cover layer of said landfill;
   providing at least one porous root growth control vessel resistant to degradation;
   inserting said at least one porous root growth control vessel into a respective one of said at least one excavated hole;
   filling said at least one porous root growth control vessel with a soil media; and
   permanently planting and growing a grapevine seedling within each of said at least one porous root growth control vessel planted in said cover of said landfill for safely producing grapes from the grapevine grown on by preventing root penetration of the grapevine into buried materials in the landfill thereby preventing uptake of any bio-accumulative chemicals that could be passed along to the grapes which may be detrimental to the health of the vine or to the human.

2. The method of growing a grapevine as claimed in claim 1 wherein said excavation step further comprises excavating a row of holes in said cover layer of said landfill.

3. The method of growing a grapevine as claimed in claim 2 wherein each hole of said row of holes is provided with a porous root growth control vessel inserted in each hole.

4. The method of growing a grapevine as claimed in claim 3 wherein each of said porous root growth control vessel is filled with a soil media.

5. The method of growing a grapevine as claimed in claim 4 wherein a grapevine seedling is planted in the media of each said porous root growth control vessel.

6. The method of growing a grapevine as claimed in claim 5, further comprising:
   digging a plurality of holes in the ground linearly aligned with each of said at least one root growth container vessel planted in said cover of said landfill;

inserting a plurality of poles, each pole of said plurality of poles inserted into a respective hole of said plurality of holes; and backfill each of said plurality of holes to provide adequate support for each respective pole of said plurality of poles, each pole of said plurality of poles having a extension portion and support wires attached to said extension portion upon which said grapevine will grow and be supported thereby; and anchoring each of the two end poles in said plurality of poles with an underground or above ground anchor system sufficient to support the weight of the grapevines with fruit on the wires above the ground.

7. The method of growing a grapevine as claimed in claim 2 wherein each porous root growth control vessel inserted in each hole is vertically longer than the hole in which it is placed and each vessel has as an additional supporting structure, earthen material suitable for landfill cover placed to surround said vessel.

8. The method of growing a grapevine as claimed in claim 2 further comprising planting a root control disc in the bottom of each hole of said row of holes.

9. The method of growing a grapevine as claimed in claim 1 further comprising the steps of placing a root growth control disc in the bottom of said excavated hole.

10. A method of growing a grapevine to produce grapes for human consumption, said method comprising the steps of:

excavating a hole in a cover layer of said a landfill;

providing a porous root growth control vessel resistant to degradation, said porous root growth control vessel selected from the group consisting of:

a nonwoven, porous, polymeric root control fabric bag;
a porous root pruning container;
a pot having a fabric liner received therein;
a container having a wall with an inner surface and an outer surface, said inner surface formed in part by a lattice of root guiding recesses substantially truncated conical form having a wall converging towards a hole through an outer wall formed in part by a lattice of protuberances so that the protuberances on said outer surface of one end nest within the recesses of said inner surfaces surface; and a root inhibiting carbon-bound material disposed on the inner surface of the sidewalls and base of a container which stores and releases the root inhibiting carbon bound materials over protracted periods of time;

inserting within said hole said porous root growth control vessel; filling said porous root growth control vessel with a soil media; and permanently planting and growing a grapevine within said porous root growth control vessel planted in said cover layer of said landfill and preventing root penetration of the grapevine into buried materials in the landfill thereby preventing uptake of any bio-accumulative chemicals that could be passed along to the grapes which may be detrimental to the health of the vine or the human consumer; and harvesting the grapes from the grapevine grown on the landfill for human consumption.

11. The method of growing a grapevine as claimed in claim 10 wherein said excavation step further comprises excavating a row of holes in said cover layer of landfill.

12. The method of growing a grapevine as claimed in claim 11 wherein each hole of said row of holes is provided with a porous root growth control vessel inserted in each hole.

13. The method of growing a grapevine as claimed in claim 12 wherein each of said porous root growth control vessel is filled with a soil media.

14. The method of growing a grapevine as claimed in claim 13 wherein a grapevine seedling is planted in the media of each said porous root growth control vessel.

15. The method of growing a grapevine as claimed in claim 14, further comprising:

digging a plurality of holes in the ground linearly aligned with said row of planted grapevines;

inserting a plurality of poles, each pole of said plurality of poles inserted into a respective hole of said plurality of holes backfill each of said plurality of holes to provide adequate support for each respective pole of said plurality of poles, each pole of said plurality of poles having a lateral extension portion and support wires attached to said lateral extension portion upon which said grapevine will grow and be supported thereby; and anchoring each of the two end poles in the plurality of poles with an underground or above ground anchor system sufficient to support the weight of grapevines with fruit on the wires above ground.

16. The method of growing a grapevine as claimed in claim 11 further comprising planting a root control disc in the bottom of each hole of said row of holes.

17. The method of growing a grapevine as claimed in claim 10 further comprising the steps of placing a root growth control disc in the bottom of said excavated hole.

* * * * *